US005526400A

United States Patent [19]

Nguyen

[11] Patent Number: 5,526,400
[45] Date of Patent: Jun. 11, 1996

[54] SYSTEM FOR ROUTING CALLS TO MOBILE SUBSCRIBERS

[75] Inventor: Viet A. Nguyen, Montreal, Canada

[73] Assignee: Telefonaktiebolaget LM Ericsson, Sweden

[21] Appl. No.: 222,599

[22] Filed: Apr. 1, 1994

[51] Int. Cl.$^6$ ............................................ H04Q 7/38
[52] U.S. Cl. ........................ 379/59; 379/60; 455/33.1
[58] Field of Search ........................... 379/57, 58, 59, 379/60, 63; 455/33.1, 54.1, 33.2, 54.2

[56] References Cited

U.S. PATENT DOCUMENTS

| | | | |
|---|---|---|---|
| 4,868,558 | 9/1989 | Andros et al. | 379/63 |
| 5,282,240 | 1/1994 | Buhl et al. | 379/59 |
| 5,339,352 | 8/1994 | Armstrong et al. | 379/58 |
| 5,353,340 | 10/1994 | Kunz | 379/60 |

OTHER PUBLICATIONS

"System 900: The ISDN Approach to Cellular Mobile Radio" M. Wizgall et al, 1989.

"Cellular Mobile Radio as an Intelligent Network Application" *Electrical Communication* vol. 63, M. Ballard et al, 1989.

"Straw Man for Automatic Roaming" Electronic Industries Association, Jun. 1985 p. 7.

"EIA/TIA Interim Standard for Automatic Roaming" Electronic Industries Association, Dec. 1991.

*Primary Examiner*—Curtis Kuntz
*Assistant Examiner*—William G. Trost
*Attorney, Agent, or Firm*—Jenkens & Gilchrist

[57] ABSTRACT

The local access and transport area identification number (LATAID) of the area within which both the A- party and B-party of a call are located is indicated within all roamer routing messages. This information enables automatic call setup within a cellular network in the most cost effective manner which still complies with the interLATA carrier regulations.

32 Claims, 9 Drawing Sheets

SYSTEM FOR ROUTING CALLS TO MOBILE SUBSCRIBERS

BACKGROUND OF THE INVENTION

1. Field of the Invention

The invention relates to communication systems for serving mobile subscribers and, more particularly, to the routing of calls to mobile subscribers within a communications network.

2. History of the Related Art

In certain radio communication systems, such as cellular radio networks, each mobile station is identified by a unique mobile identification number (MIN) and is associated with a particular geographic area served by a particular home exchange. When the mobile station moves out of the area served by its home exchange and "roams" into other exchanges connected within the same radio network, a plurality of databases maintain information as to the current location and operation state of the mobile. For example, associated with each exchange, i.e., mobile services switching center (MSC), there is a home location register (HLR) which stores data defining the features to which each subscriber who has that MTSO as its home exchange has subscribed along with data identifying the current location within the network of each such subscriber. Similarly, each exchange also maintains a database listing each visiting or "roaming" mobile station currently operating within its exchange area along with indicia including the current busy state of that subscriber and its current cell or location area position.

Conventionally, a call intended for completion to a mobile subscriber arrives from the PSTN at an exchange connected as part of the cellular network [the gateway exchange (G-MSC)]. The gateway exchange sends a routing request message to the home location register of the mobile station for which the call is intended. From its database the HLR identifies the particular exchange within which the mobile station is currently located and forwards the routing request on to that exchange (the visited exchange). The visited exchange then returns to the gateway exchange a routing number identifying the mobile subscriber to which the call is directed within the visited exchange. The gateway exchange then seizes a voice circuit and routes the call from the gateway to the visited exchange. The mobile is paged within the visited exchange and the call completed.

A substantial improvement upon this prior art technique of completing calls to roaming mobile subscribers within a cellular communication network is shown in U.S. Pat. No. 5,282,242, hereby incorporated by reference, in which the function of call set-up to the mobile station is performed before the call is routed via voice circuits to the visited exchange. In this technique, when a visited exchange receives a routing request message from a gateway exchange indicating its desire to complete a call to a mobile station roaming within the visited exchange, the visited exchange first pages the mobile station and places it on a voice channel prior to returning a routing number to the gateway exchange. In this way, the expensive voice communication circuits between the gateway and visited exchanges are not tied up during the period when the visited exchange is attempting to locate the mobile station within its cellular coverage area. This technique also eliminates the possibility of wasted voice circuit time in the event the mobile station cannot be located or cannot be placed upon a voice channel because of difficulties with radio transmission at that particular time. This technique has resulted in substantial advantages and cost savings to mobile system operators.

An additional concept which has assumed increasing importance in the operation of cellular radio systems is that of the existence of local access and transport areas (LATAs). When the Bell system was broken up during the '80s with long distance service being allocated to AT&T and local service being allocated to the regional Bell operating companies (RBOCs), the United States was divided into a number of LATAs. The Final Judgment Rules under which local and long distance services are allocated between AT&T (as well as MCI and Sprint) as long distance carriers and the RBOCs as local service providers include the basic principle that the RBOCs are only allowed to provide service which originates and terminates within the same LATA. If a call originates in one LATA and is terminated in another LATA, even if the LATAs are adjacent to one another, the service must be completed through one of the three long distance carriers.

More recently, the local/long distance service allocation rules have been further modified to provide that automatic roaming of cellular subscribers within the national cellular network must be performed in accordance with the same rules separating local and long distance carriers. Thus, automatic roaming must ensure that when a call is routed from a gateway exchange to a roaming subscriber in a visited exchange which is busy, an interexchange carrier is used to return a busy tone from the visited exchange to the calling subscriber. In addition, interexchange carrier voice circuits must be used to determine whether or not a roaming mobile is located in a particular visited exchange (rather than using private data circuits as contemplated in U.S. Pat. No. 5,282,240) if the gateway exchange and the visited exchange are located in different LATAs. One way of dealing with this issue is to treat all visited exchanges and gateway exchanges as if they are in different LATAs and consequently disable all busy return procedures and location before routing procedures in the network. However, this procedure also prevents the proper and appropriate usage of both of these money-saving techniques in the case of calls which both originate and are completed in the same LATA even though the call is between two different exchanges, one serving as the gateway and one serving as the visited exchange within the same LATA.

The system of the present invention enables the efficient and cost effective implementation of busy indication, call set up before routing, and call forwarding on busy which is consistent with the current regulatory requirements of automatic roaming call set up within a multi-LATA mobile cellular network.

SUMMARY OF THE INVENTION

In one aspect, the system of the present invention includes the incorporation of LATA information relating to the originating exchange in a routing request message used in automatic roaming call set up. Similarly, the LATA information of the B-party to whom the call is directed is also placed in message containing routing information to enable the proper allocation of services consistent with the regulatory requirements for automatic roaming within a cellular system.

In another aspect, the present invention includes the automatic routing of calls within a cellular telecommunication network divided into a plurality of local access and transport areas (LATAs) and which includes a plurality of exchanges within which mobile stations may roam and are connected to one another by both signaling data lines and voice circuits and in which calls incoming to a gateway exchange are routed to called mobile stations within other exchanges. The LATA within which a call to be routed to a terminating subscriber originates and the LATA within which the terminating subscriber is located are both determined. The originating LATA and the terminating LATA are compared to one another and the call is routed from the originating subscriber to the terminating subscriber through the network in response to the results of the comparison. If the network includes a pre-routing call setup functional capability of locating a called mobile station within the network and placing that mobile station on a voice channel by means of signals sent entirely over the signaling data lines and prior to seizing a voice circuit and routing the call from the gateway exchange to the exchange where the mobile is currently located, the pre-routing call setup functional capability is enabled in response to the originating LATA and terminating LATA being the same and disabled in response to the originating LATA and terminating LATA being different. In the latter case, once the called mobile station is identified within the exchange where it is currently located by means of the signaling data lines, a voice circuit from the gateway exchange to that exchange is seized while the call is attempted to be completed to the terminating mobile station.

In a further aspect of the invention, each of the LATAs are identified by a different LATAID number and the LATAID of the originating A-party is included within a routing request message sent via the signaling data lines from the gateway exchange to the exchange in which the B-party is currently located.

In yet another aspect, the invention includes the automatic routing of calls within a cellular telecommunication network divided into a plurality of local access and transport areas (LATAs) each of which is identified by a different LATAID number and includes a plurality of exchanges within which mobile stations may roam by virtue of the storage of current location information in a home location register (HLR) associated with each mobile. The exchanges are connected to one another by both signaling data lines and voice circuits and a call incoming to a gateway exchange is automatically routed to the called mobile station located within a visited exchange. A call is received at the gateway exchange from an A-party directed to the mobile station of a B-party located within the cellular network and the LATAID of the A-party is determined. A location and routing request message is sent via the signaling data lines from the gateway exchange to the HLR of the B-party with the message containing the LATAID of the A-party. The routing request message is then forwarded from the HLR of the B-party to the visited exchange in which the B-party is believed to be currently located and the visited exchange determines the LATAID of the B-party and whether the B-party is currently busy. The LATAID of the A-party is compared with the LATAID of the B-party and the mobile station of the B-party is paged in response to a determination that the B-party is not busy and that the LATAID of the A-party and the B-party are the same. Next, the mobile station of the B-party is placed on a voice radio channel in response to the receipt of a page response therefrom and a routing number identifying the current location of the mobile station of the B-party is returned from the visited exchange to the gateway exchange by means of the signaling data lines. Finally, a voice circuit between the gateway exchange and the visited exchange is seized in response to the receipt of a routing number, the call routed from the A-party to the visited exchange by means of the seized voice circuit, and the call set up within the visited exchange from the A-party to the B-party waiting on the radio channel of the visited exchange.

BRIEF DESCRIPTION OF THE DRAWINGS

For a more complete understanding of the present invention and for further objects and advantages thereof, reference may now be had to the accompanying description taken in conjunction with the accompanying drawing in which.

DETAILED DESCRIPTION

Figure 1:
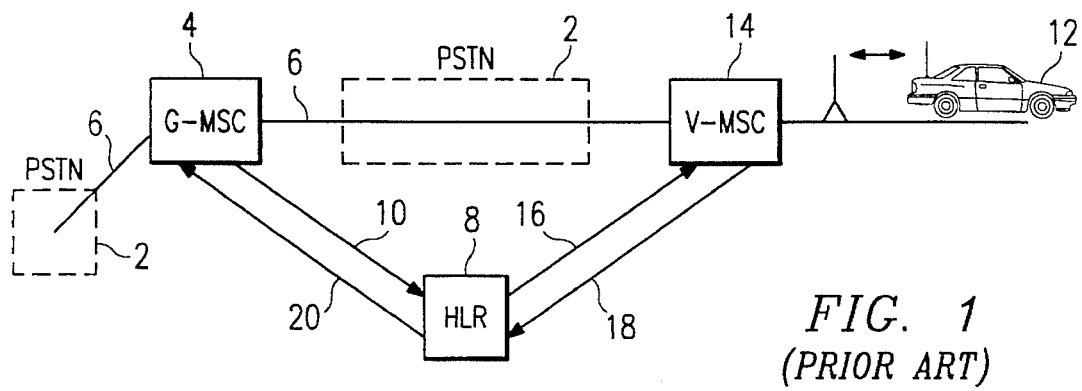
FIG. 1 is a block diagram illustrating conventional prior art call routing for automatic roaming within a mobile exchange network.

Referring first to FIG. 1, there is shown a block diagram illustrating conventional automatic roaming within a cellular exchange network. This system incorporates "route first-page later" automatic roaming in which an incoming call from the public switched telecommunication network (PSTN) 2 is first routed to an interrogation or gateway MSC (G-MSC) 4 via a voice line 6. Part of the information transmitted from the calling party (the "A-subscriber") within the PSTN to the G-MSC 4 is information regarding the identity (the "B-number") of the party for whom the call is intended (the "B-subscriber"). From its analysis of the B-number, the G-MSC 4 determines the B-subscriber's home exchange (H-MSC) or home location register (HLR) 8 and, via a private signaling data line 10, the G-MSC 4 asks the HLR 8 for a routing number. If the B-subscriber is roaming, e.g., and is currently located within the service area served by a visited exchange (V-MSC), the V-MSC 14 has the routing request forwarded on to it from the HLR 8 via the private signaling data line 16. A routing number is then returned to the G-MSC 4 via the data line 18, the HLR 8 and the data line 20 which thereafter routes the call directly to the V-MSC 14 through voice circuits within the PSTN 2 as shown. When the V-MSC 14 receives the incoming call from the G-MSC 4, paging of the mobile station 12 to which the call is directed (B-party) is begun.

If the B-party mobile station 12 does not reply to the page signal by issuing a page response signal, or if there are no available radio channels for connection of the mobile station 12 into the radio network, or the B-subscriber is busy and does not have "call waiting" or "call forwarding on busy" the routing and use of the voice lines 6 from the PSTN 2 through the interrogation exchange 4 to the visiting exchange 14 have all been occupied for a period of time without the completion of a call to the B-party. Such voice circuits are expensive and cost the cellular system operator without any offsetting revenue from call completion.

As mentioned above, the entire telephone service area within the United States is divided into local access and transport areas (LATAs) each of which has a local access and transport area identification number (LATAID). Individual calls within the cellular network are said to be interLATA call cases if the terminating point in the V-MSC and the originating point of the call in the G-MSC are located in different LATAs. The terminating point for each automatic roaming call is the V-MSC, where the terminating B-subscriber is located or is suspected or believed to be located. The basic regulations governing call completion are that any interLATA calls must be completed through a long distance carrier and may not be completed by a single regional telephone company even though it may serve two adjacent LATAs. The call set up signals to and from the HLR and the H-MSC are not considered to be covered by these call completion regulations because the HLR is not a switching node and the H-MSC is usually in the same LATA as the G-MSC when a subscriber is roaming.

With automatic roaming signalling as used in the current cellular network, the gateway MSC is informed by the V-MSC as to whether or not the terminating subscriber is busy during the roaming number interrogation process performed by the G-MSC. If the terminating subscriber is not busy, a roaming number is returned to the G-MSC and the call is set up to the VMSC. If the B-subscriber who is sought is currently busy (and does not have an automatic call waiting) then a busy indication is returned over data lines to the GMSC, via the H-MSC or HLR, and the G-MSC handles the call according to procedures within that exchange, such as a busy tone, announcement or transfer on busy, etc. In accordance with current automatic roaming call completion regulations, busy indications cannot be passed over signalling data lines across LATA boundaries and when the G-MSC is in a different LATA than the V-MSC, a busy indication signal cannot be passed from one to the other during the roaming number interrogation process. Thus, under current regulations, calls must be routed to the V-MSC as if the terminating subscriber is not busy so that the busy notification is handled by the V-MSC via the voice circuits of a long distance carrier.

In pre-routing call set up in accordance with the teachings of U.S. Pat. No. 5,282,240 as discussed above, the B-party mobile station is placed on a voice radio channel before a roaming number is actually returned from the V-MSC to the G-MSC via private data lines. This ensures that a call is actually terminated to the mobile station before voice circuits are occupied between the G-MSC and the V-MSC. Under current automatic roaming call completion regulations, such pre-routing call setup is not allowed where the GMSC and the V-MSC are located in different LATAs. The inability to use pre-routing call setup significantly affects the rate of successful call delivery and enhances the cost of operation of a cellular operator.

Figure 2:
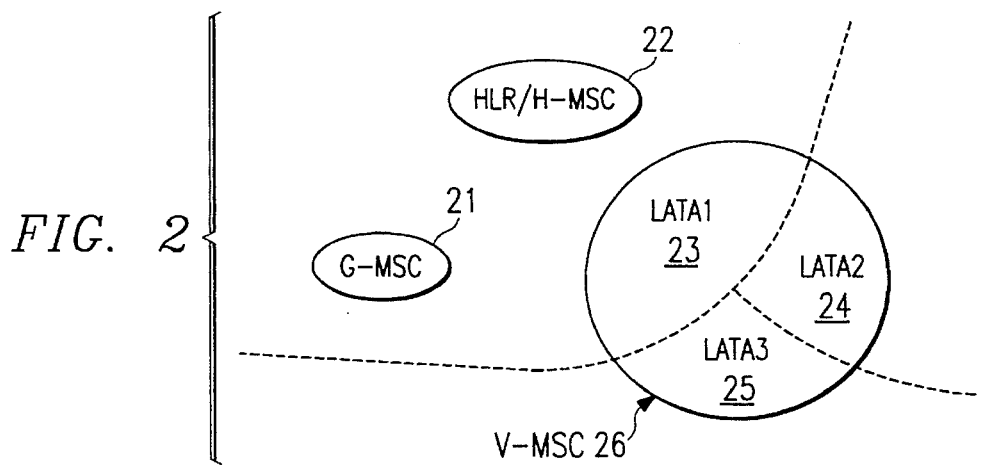
FIG. 2 is a diagram illustrating a portion of a cellular network in which a gateway exchange and a visited exchange are located in different LATAs.

Referring next to FIG. 2, there is illustrated one solution to the interLATA call case which assures the compliance with current automatic roaming call completion regulations. In FIG. 2 it is shown that the G-MSC 21 and the H-MSC/HLR 22 are located in LATA1 23. The V-MSC 26 is located in a different LATA3 25 contiguous to both LATA2 24 and LATA1 23. It is possible to determine whether the call case is interLATA or intraLATA on a per cooperating exchange basis using cooperating exchange data. However, in a situation of a multi-LATA switch, i.e., in which the serving area is divided into a number of separate LATAs, the use of cooperating exchange data treats the entire serving area in the same manner. Thus, in FIG. 2, the G-MSC 21 would be required to treat all three LATAs in the V-MSC 26 in the same manner. That is, the entire serving area of V-MSC 26 would be considered to be in a different LATA from that of the G-MSC 21 regardless of where the terminating subscriber is located in the V-MSC. Thus, even if a terminating B-subscriber is located in LATA1 23 of the V-MSC 26, it would be in the same LATA as the G-MSC 21 but it could not be treated as such from a call completion standpoint.

Figure 3:
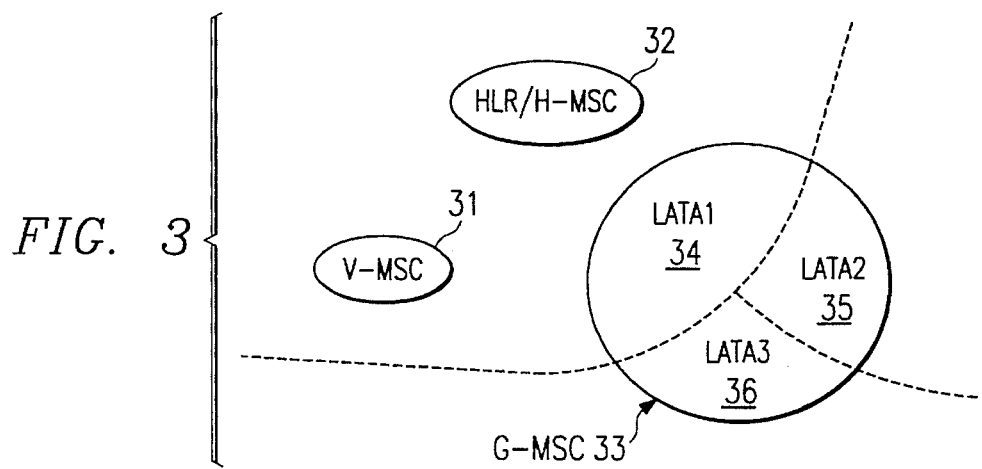
FIG. 3 is a diagram illustrating a portion of a cellular network in which a gateway exchange and a visited exchange (along with an HLR) are located in different LATAs.

Similarly, FIG. 3 illustrates the circumstance in which the V-MSC 31 would treat all call cases originating from the G-MSC 33 in the same manner (even though G-MSC 33 is made up of serving areas falling within three different LATAs: LATA1 34, LATA2 35, and LATA3 36). That is, the whole serving area of the G-MSC 33 is considered to be in a different LATA than the V-MSC 31 even though it is located within LATA1 34, comprising only a part of the area served by the G-MSC 33.

The system in the present invention minimizes the negative effects of the automatic roaming call completion regulations within a mobile cellular network. For example, in FIG. 2 if the subscriber to which the call is directed is located in LATA1 23 of the VMSC 26, then a call completion to that subscriber is not required to be made via a long distance carrier since the originating subscriber is connected through the G-MSC 21 located in the same LATA. Similarly, in FIG. 3, if the originating point for the call is located in the LATA1 portion of the G-MSC 33 serving area, and the call is completed to the V-MSC 31, neither the roaming number interrogation process nor the call completion process is required to conform to the automatic call completion regulations with respect to the use of a long distance carrier since the terminating subscriber is located in the same LATA1 34 as the originating subscriber. The system of the present invention provides a means for completing calls in both interLATA situations and intraLATA situations based on precise LATA identification information related to origination and termination points, without the use of cooperating exchange data.

The system of the present invention incorporates the LATAID of the originating point in the G-MSC as well as the LATAID of the terminating point in the VMSC within roaming signalling messages. Thus, call completion decisions can be made based upon a comparison of the respective LATAIDs as to whether the particular call completion case is intraLATA or interLATA. Such call completion decisions enables the optimum usage of both called party busy information as well as call routing before completion procedures that are consistent with the regulations governing automatic call routing within a mobile cellular network. The system of the present invention allows calls to and from exchanges which lie in more than one LATA to distinguish between the different LATAs of originating and terminating points within the same exchange and enables the use of optimum allowable procedures for inter-exchange call completion.

Figure 4:
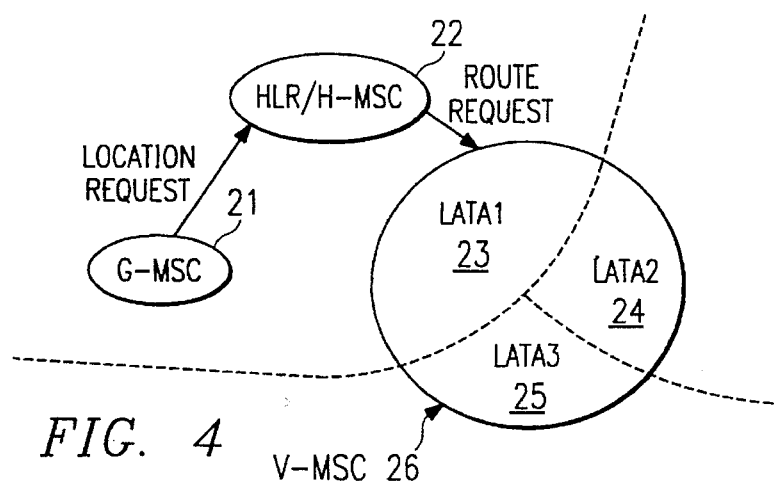
FIG. 4 is a diagram illustrating call routing within the network exchange arrangement of FIG. 2.
Figure 5A:
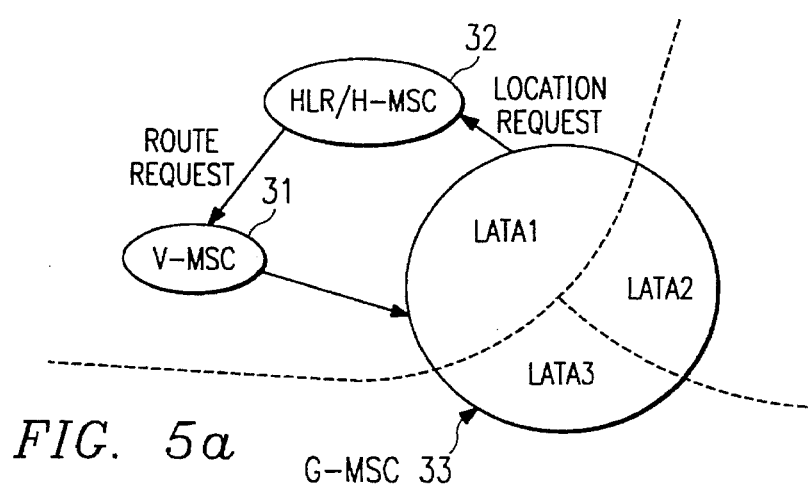
FIGS. 5a–5b are diagrams illustrating call routing within the network exchange arrangement of FIG. 3.
Figure 5B:
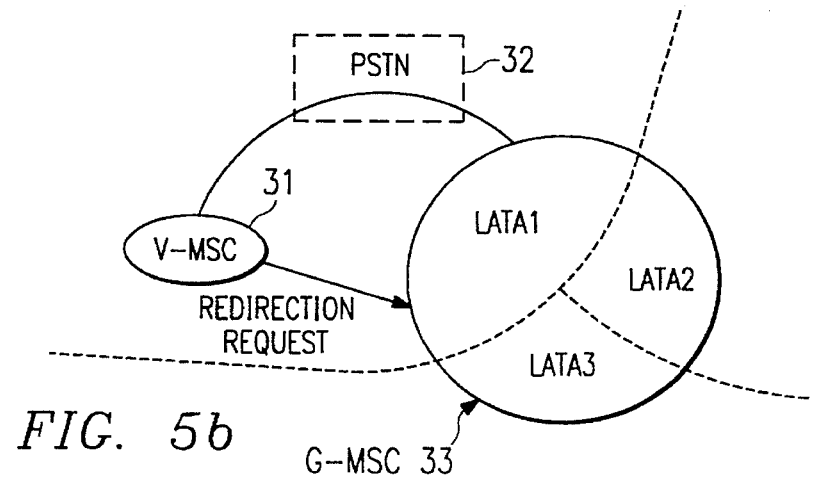
Figure 6A:
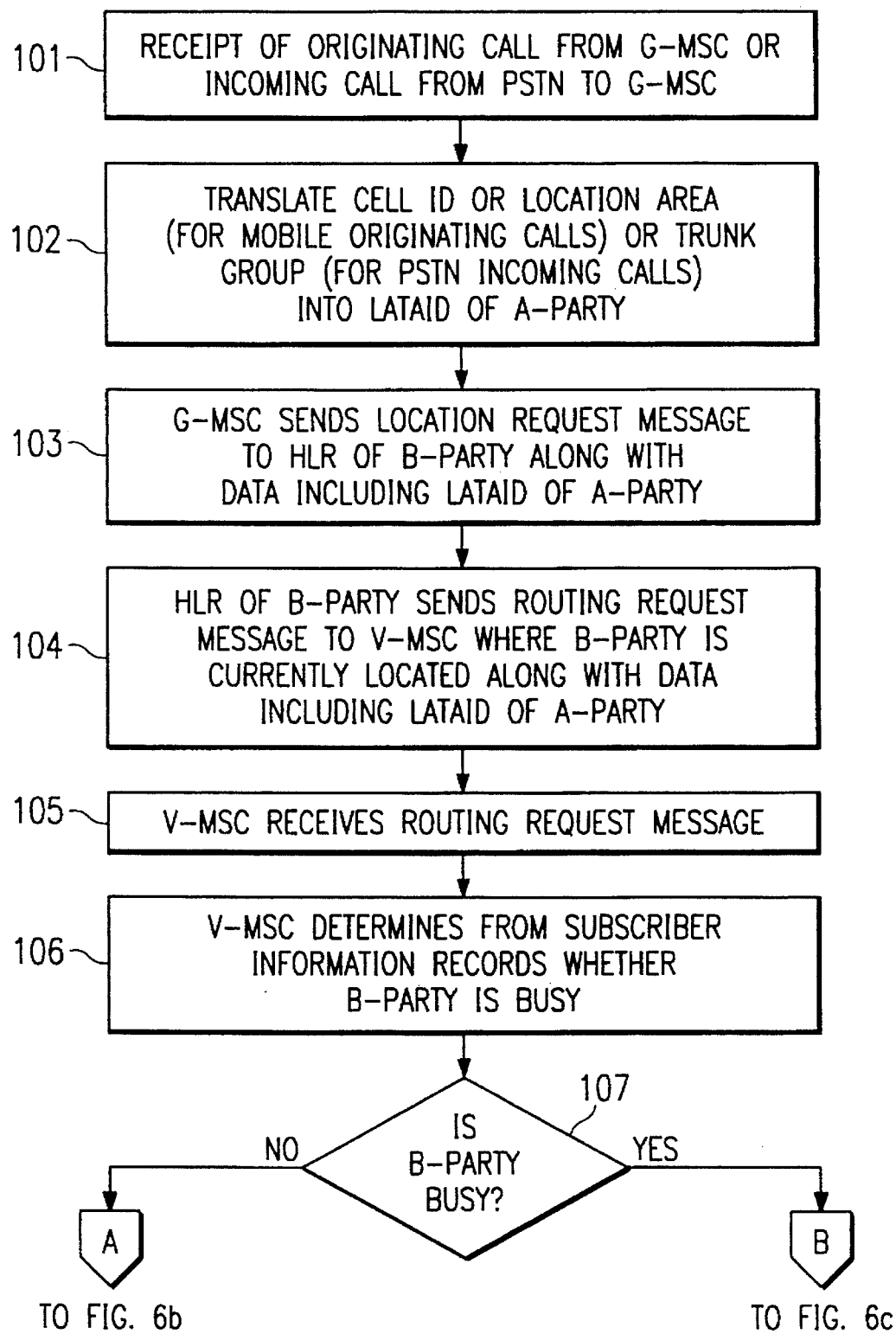
FIGS. 6a–6e are flow charts illustrating one aspect of the method of the present invention.
Figure 6B:
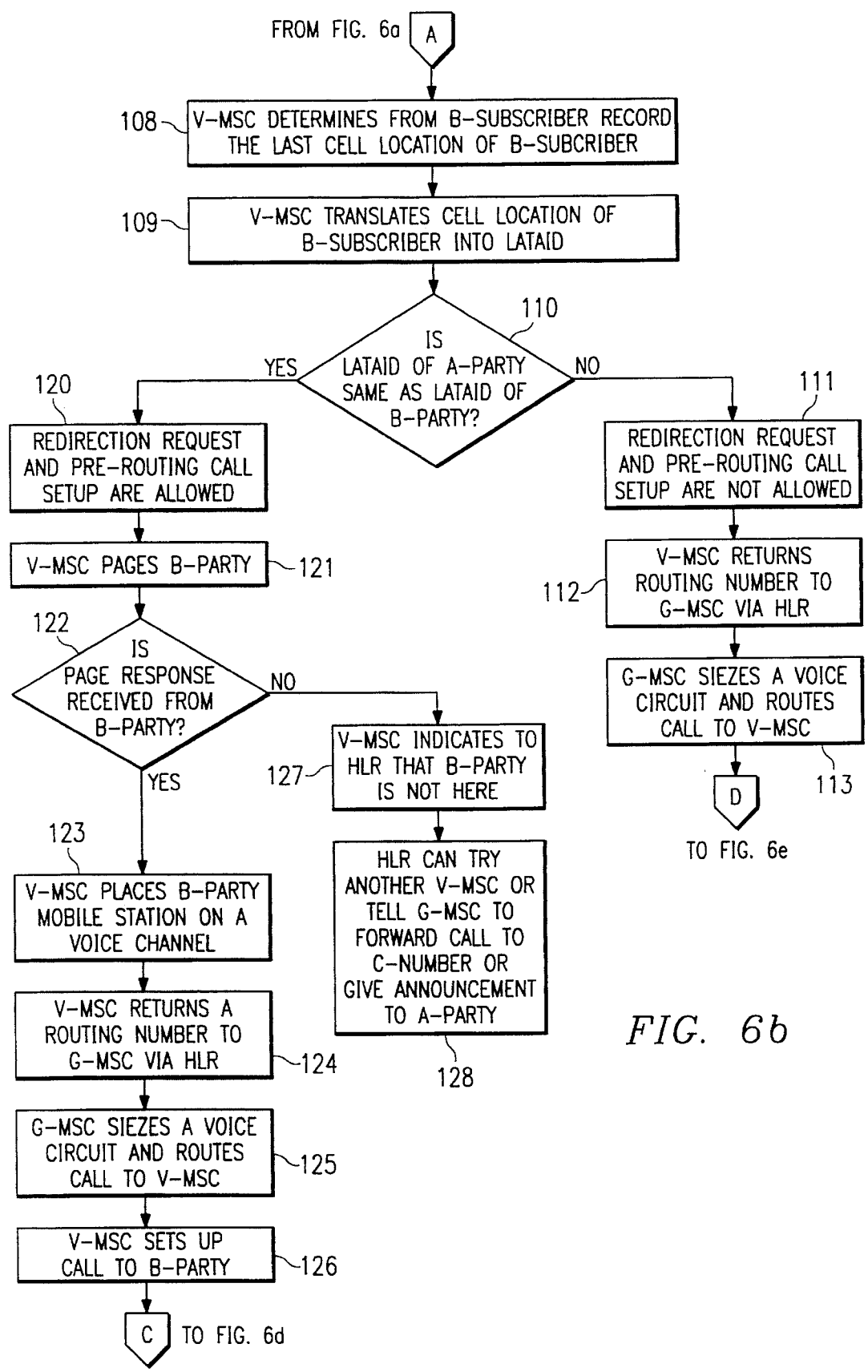
Figure 6C:
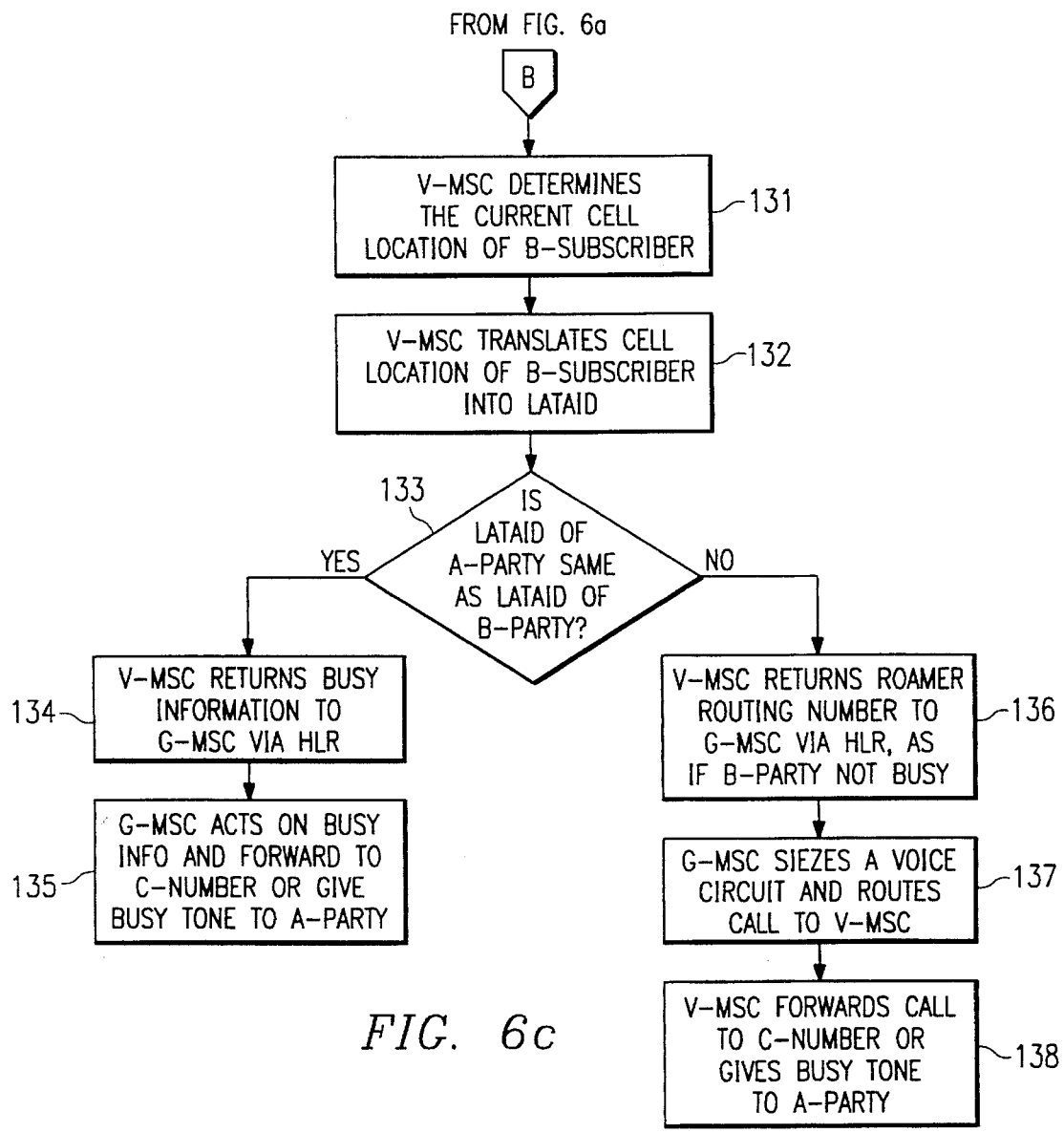
Figure 6D:
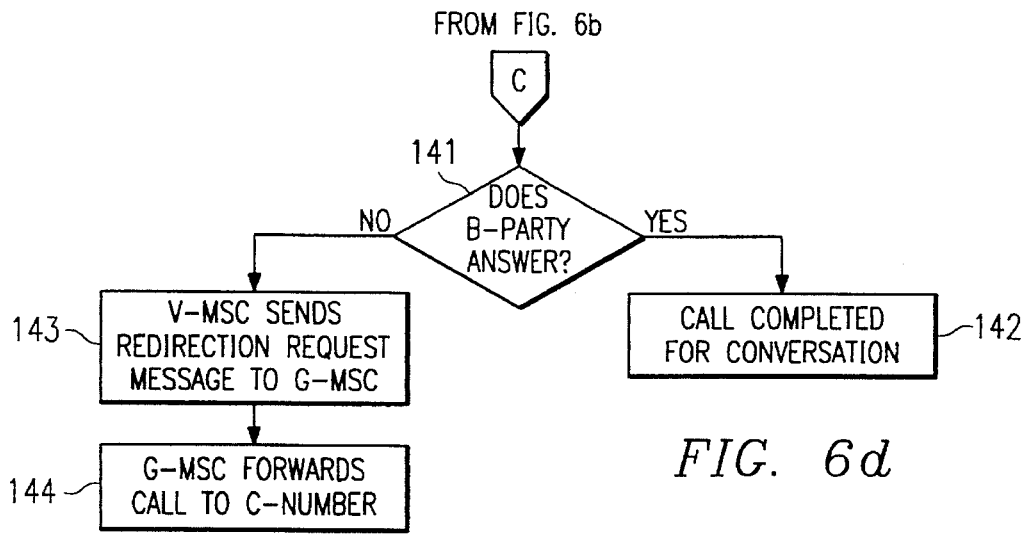
Figure 6E:
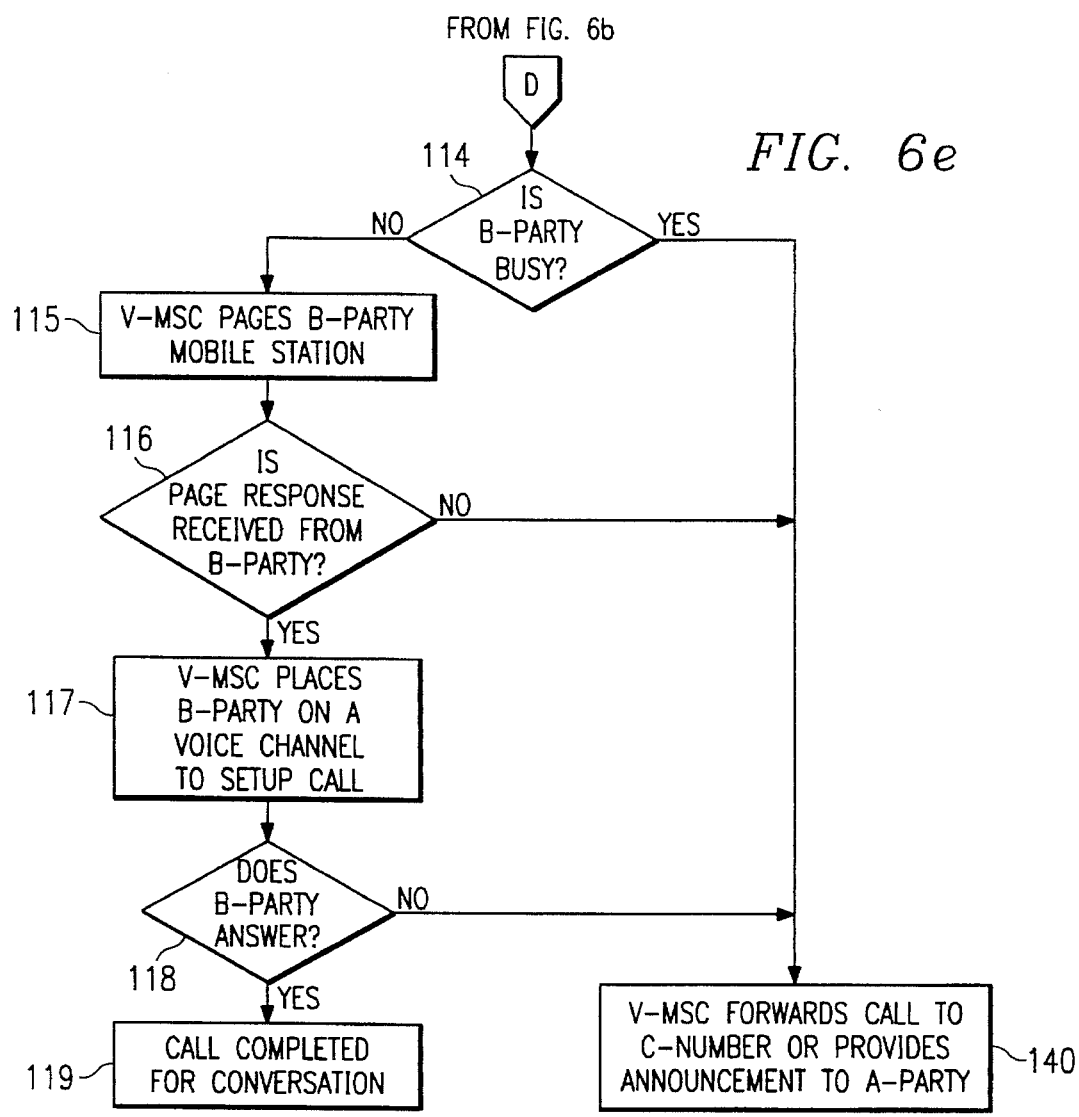

During a roamer routing identification determination process, the LATAID of the originating point, the gateway MSC is included in the location and routing request messages sent from the gateway G-MSC to the V-MSC. At the terminating V-MSC, the LATAID of the originating point in the gateway MSC is compared with the terminating LATAID and if the two are the same, then the call is an intraLATA call and is not required to be completed via a long distance carrier voice circuit. In such a case, there is no need to suppress the pre-routing call setup functionality within the system or to suppress the functions of sending a busy indication from the V-MSC to the gateway MSC via a signalling network. Similarly, if the LATAIDs are different, the call completion case is an interLATA call and thus both functions must be suppressed in order to comply with automatic roaming call completion regulations. For example, as shown in FIG. 4, if the terminating B-subscriber is located in LATA1 23 then pre-routing call setup is allowed. However, without providing the system with an indication of the LATAID of the originating gateway MSC 21, regardless of the terminating point, pre-routing call setup could not be used. The LATAID information is also used to limit the paging of the sought after mobile station to within the proper LATA (LATA1 in this example) or to reject a page response from mobile stations located in other LATAs (LATA2 or LATA3 in the present example). Similarly, in the case of redirection request messages for automatic call forwarding on busy, the terminating LATA within the V-MSC is used at the G-MSC to determine whether the G-MSC can process the redirection request message or reject it. Likewise, the originating LATA within the G-MSC is used at the V-MSC to determine whether or not pre-routing call setup can be used or a redirection message can be sent. In FIG. 5a, the V-MSC 31 determines, based upon the originated LATAID sent in the routing request message sent from the originating gateway MSC 33, whether pre-routing call set up is allowed. Similarly, in FIG. 5b, the V-MSC 31 determines, based upon the originating LATAID sent in the routing request message from the gateway MSC 33, whether the sending of a redirection request message to the G-MSC 33 is permissible within the regulations of automatic roaming. If the call originating point within the G-MSC 33 and the originating LATAID is not LATA 1, then the sending of a redirection request message to the G-MSC 33 is not allowed. If, however, the call completion restrictions are not on the V-MSC 31 but on the G-MSC 33, then based upon the terminating LATAID included in the redirection request message, the G-MSC 33 determines whether it should reject or accept this message. If the originating point is not within LATA1 then the message must be rejected.

Thus, without providing to the system an indication of the LATAID all redirection request messages from the V-MSC 31 to the G-MSC 33 cannot be accepted regardless of the originating point. Providing within system messages an indication of the LATAIDs of call originating and terminating points allows a more efficient usage of redirection request messages and enhances the call completion efficiently of cellular networks while complying with legal regulations.

Referring next to FIGS. 6a–6e, there are shown flow charts illustrating certain principles used in the method and system of the present invention. At 101, a call is received from an A-subscriber at a gateway MSC which is directed to a mobile subscriber at a B-number. The call can be from a mobile subscriber in the G-MSC or an incoming call from the PSTN to the G-MSC. At 102, the gateway MSC translates the cell or location area of the A-party (if a mobile station in the G-MSC) or the trunk group (if an incoming call from the PSTN) into the LATAID of the A-party. At 103, the gateway MSC sends a location message including the LATAID of the A-party from the G-MSC to the HLR of the B-party. At 104 the HLR then routes a routing request message containing the LATAID of the A-party to the visited exchange (V-MSC). Next, at 105 the V-MSC receives the routing request message. At 106, the V-MSC translates the MIN of the B-party and locates the subscriber record of the B-party within its data base. From the subscriber record of the B-party, the V-MSC determines at 107 whether or not the B-party is currently busy.

If at 107, the B-party is determined to be not busy the system moves to 108 (FIG. 6b) at which the VMSC determines from its subscriber records the latest cell or location area of the mobile station of the B-subscriber. Next, at 109, the V-MSC translates the B-subscriber's cell or location area into its LATAID. At 110 the LATAID of the A-party and the LATAID of the B-party are compared to one another. If the originating LATAID and the terminating LATAID, of the A and B-parties respectively, are not the same, the system moves to 111 at which it recognizes that the sending of redirection request messages and pre-routing call setup and sending of redirection request message are not allowed. In such case, the system causes the V-MSC to send at 112 the routing number information to the gateway MSC via the HLR. At 113, the gateway MSC seizes a voice circuit and routes the call to the VMSC. When the call reaches the V-MSC, at 114 (FIG. 6e) a check is made to determine if the B-party is busy. If the B-party is not busy at 114 (FIG. 6e) the V-MSC pages the B-party mobile station at 115. If a page response signal is received from the mobile station of the B-party at 116, the V-MSC assigns a voice channel to the mobile station at 117 and determines at 118 whether or not the B-party answers the call. If the B-party answers, the system completes the call to the B-party at 119. If, at 114 the B-party is determined to be busy, at 115 no page response is received from the B-party, or at 118 no voice channel acknowledgement is received from the B-party, the system moves to 140 and the V-MSC either forwards the call to a C-number or provides an appropriate announcement to the A-party.

If, however, at 110 (FIG. 6b), the system determines that the LATAID of the A-party and the LATAID of the B-party are the same, then it recognizes at 120 that the sending of redirection request messages and pre-routing call set up are allowed. If prerouting call setup is in effect, the system moves to 121 and pages the mobile station of the B-party. If at 122, a page response is received from the B-party the V-MSC assigns a voice channel to the mobile station at 123 and, in response to a voice channel acknowledgment from the mobile station of the B-party thereafter moves to 124 where it sends routing information to the gateway MSC. Next, at 125, the G-MSC seizes a voice circuit and routes the call from the gateway MSC to the V-MSC and sets up the call to the B-party mobile station at 126. Thereafter, at 141 (FIG. 6d), the system determines whether or not the B-party answers the call. If the B-party answers, the call is completed at 142 and conversation proceeds between the two parties. If, at 141, the B-party does not answer the call, the system moves to 143 and the V-MSC sends a redirection request message to the G-MSC and thereafter the G-MSC forwards the call to a C-number at 144.

If at 122 no page response is received from the mobile station of the B-party, the V-MSC sends a message to the HLR that the B-party cannot be located at the V-MSC. In response, the HLR has several options at 128. It can try another V-MSC at which the mobile station of the B-party may possibly be found; it can notify the G-MSC to forward the call to a C-number; or it can provide an announcement to the A-party indicating that the B-party could not be located.

If at 107 (FIG. 6a) the B-party was determined to be busy, the system moves to 131 (FIG. 6c) at which the V-MSC determines the current cell or location area of the mobile station of the B-subscriber. Next, at 132, the V-MSC translates the B-subscriber's current cell or location area into its LATAID. At 133 the LATAID of the A-party and the LATAID of the B-party are compared to one another. If the originating LATAID and the terminating LATAID, of the A and B-parties respectively are the same, the system moves to 134 and the V-MSC returns the busy information to the G-MSC via the HLR and by means of the private signaling data circuits. Thereafter, at 135, the G-MSC acts on the busy information it received from the HLR by forwarding the call to a C-number or providing a busy tone to the A-subscriber. In this case, no voice circuit from the GMSC to the V-MSC is seized (which would be a waste of resources since the B-subscriber is busy).

If, however, at 133 the LATAID of the A-party and the LATAID of the B-party are not the same, the V-MSC at 136 returns a roamer routing number to the G-MSC via the HLR, just as if the mobile station of the B-party was not busy. In response, the G-MSC moves at 137 to seize a voice circuit and routes the call to the V-MSC. At 138 the V-MSC either forwards the call to a C-number or provides a busy tone to the A-party. In this case, long distance service providers receive revenue from the use of a voice circuit since the A and B-parties are located in different LATAs.

Figure 7A:
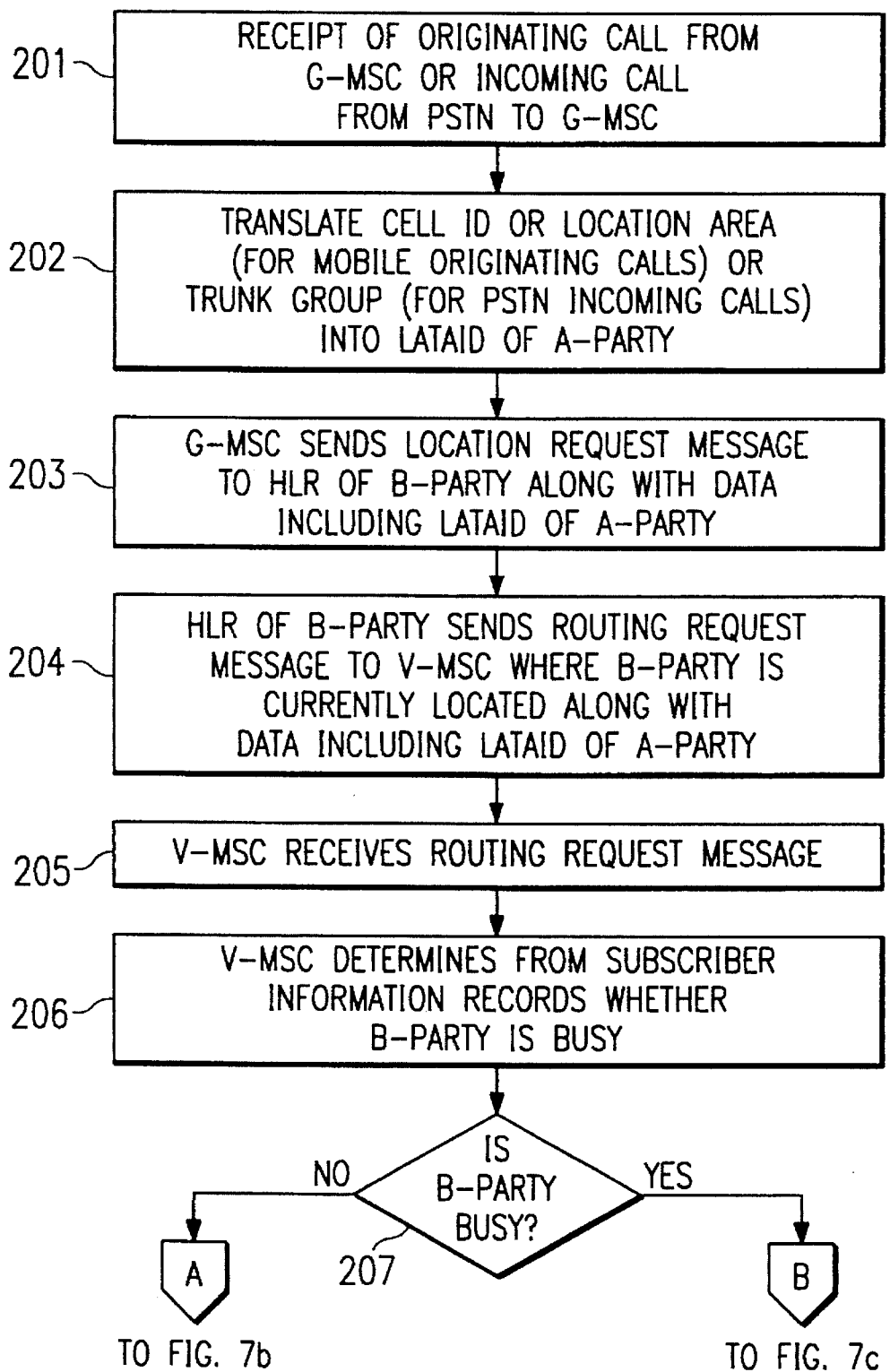
FIGS. 7a–7c are flow charts illustrating another aspect of the method of the present invention.
Figure 7B:
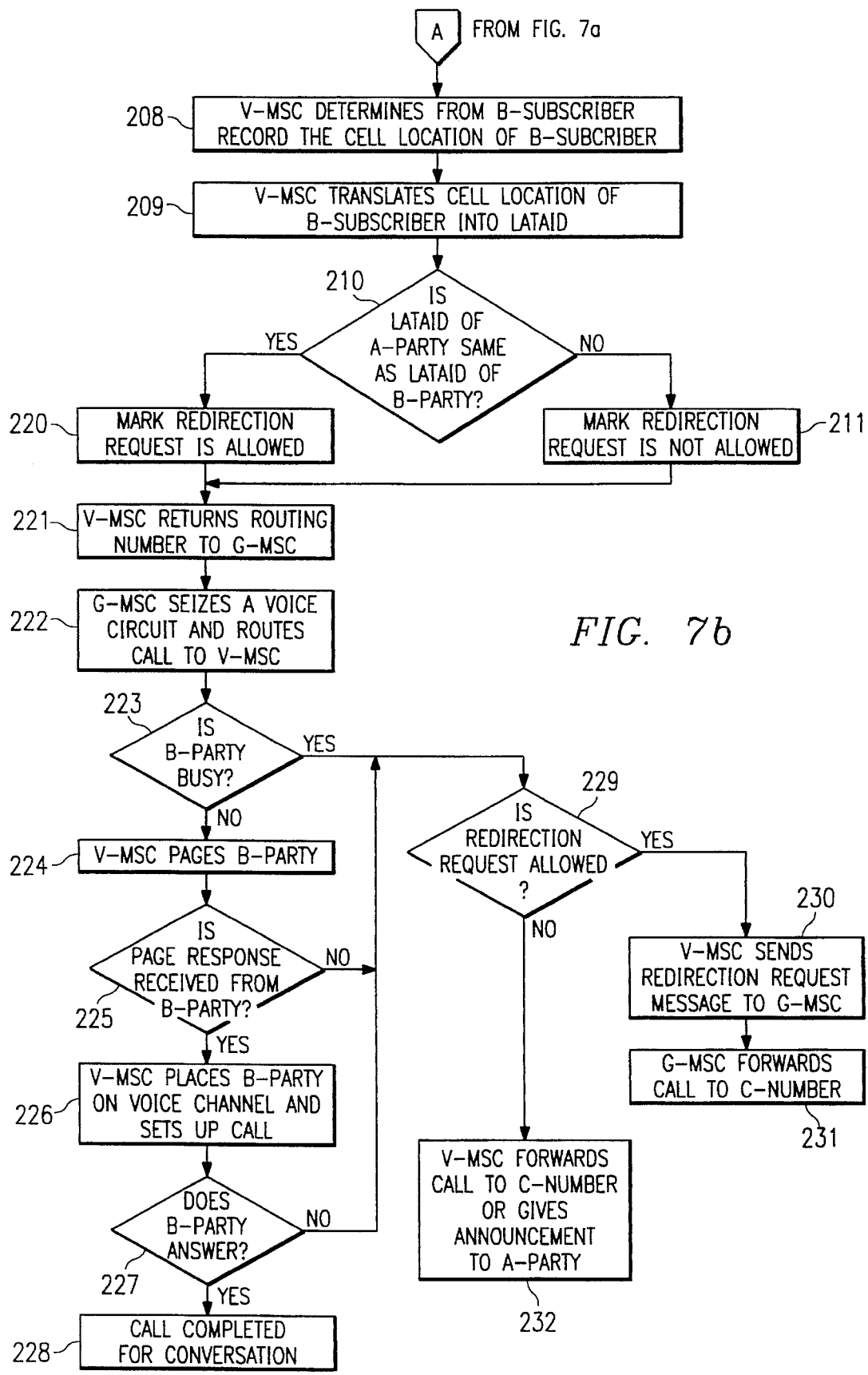
Figure 7C:
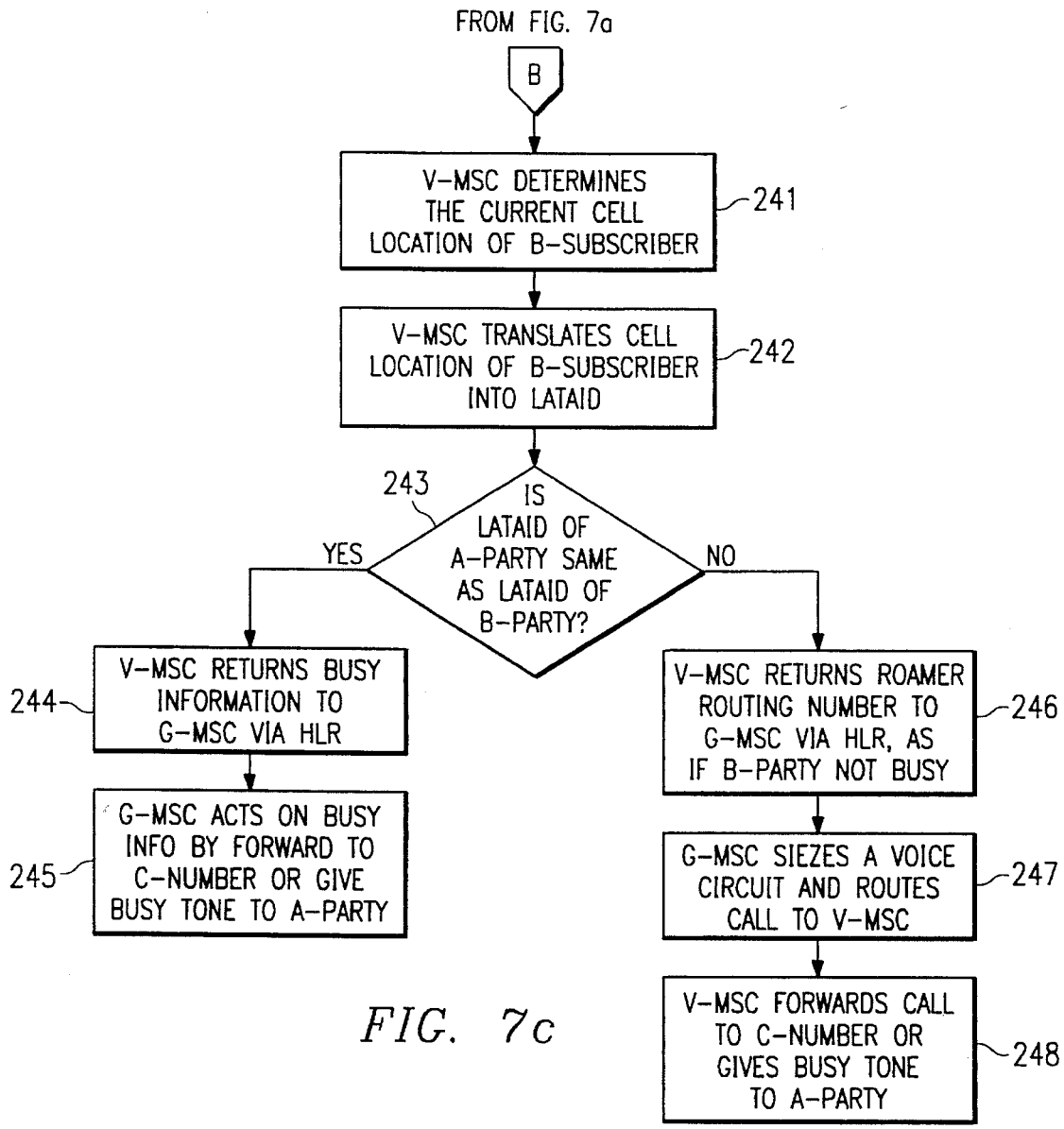

In the flow charts of FIGS. 6a–6e, it is assumed that the pre-routing call setup is supported in the cellular network. In FIGS. 7a–7c there set forth procedures in accordance with certain aspects of the present invention for the case in which pre-routing call setup is not supported in the cellular network.

Referring next to FIGS. 7a–7c, there are shown flow charts illustrating certain principles used in the method and system of the present invention when implemented within a cellular network in which prerouting call setup is not supported. At 201, a call is received from an A-subscriber at a gateway MSC which is directed to a mobile subscriber at a B-number. The call can be from a mobile subscriber in the G-MSC or an incoming call from the PSTN to the G-MSC. At 202, the gateway MSC translates the cell or location area of the A-party (if a mobile station in the G-MSC) or the trunk group (if an incoming call from the PSTN) into the LATAID of the A-party. At 203, the gateway MSC sends a location and routing request message including the LATAID of the A-party from the G-MSC to the HLR of the B-party. At 204 the HLR then routes the location and routing request message containing the LATAID of the A-party to the visited exchange (V-MSC). Next, at 205 the V-MSC receives the routing request message. At 206, the V-MSC translates the MIN of the B-party and locates the subscriber record of the B-party within its data base. From the subscriber record of the B-party, the V-MSC determines at 207 whether or not the B-party is currently busy.

If at 207, the B-party is determined to be not busy the system moves to 208 (FIG. 7b) at which the VMSC determines from its subscriber records the latest cell or location area of the mobile station of the B-subscriber. Next, at 209, the V-MSC translates the B-subscriber's current cell or location area into its LATAID. At 210 the LATAID of the A-party and the LATAID of the B-party are compared to one another. If the originating LATAID and the terminating LATAID, of the A and B-parties respectively, are not the same, the system moves to 211 at which it recognizes that redirection request is not allowed and marks the record within system accordingly. If, however, the originating LATAID and the terminating LATAID, of the A and B-parties respectively, are the same, the system moves to 221 at which it recognizes that redirection request is allowed and marks the record within system accordingly. In either case, the system next moves to 221 and the V-MSC returns a routing number to the G-MSC in response to which the G-MSC seizes a voice circuit and routes the call to the V-MSC at 222.

At 223 the V-MSC determines whether or not the B-party is busy and, if not, the V-MSC pages the B-party at 224. If a page response is received from the B-party at 224, the V-MSC places the B-party on a voice channel and sets up the call at 226. If the B-party answers at 227, the call is completed for conversation at 228. If, however, the B-party was busy at 223, no page response was received from the B-party at 225 or the B-party does not answer at 227, the system moves to 229 and asks whether or not a redirection request is allowed. In response, the system looks to whether the call was marked as redirection requests being allowed or not allowed at 220 or 221, respectively, (depending upon the respective LATAIDs of the A-party and B-party). If redirection requests are allowed, the system moves to 230 and the V-MSC sends a redirection request message to the G-MSC and, in response thereto, the G-MSC forwards the call to the appropriate C-number. If, at 229 it is recognized that redirection requests are not allowed for this call, the system moves to 232 and the V-MSC forwards the call to a C-number or provides an appropriate announcement to the A-party.

If at 207 (FIG. 7a) the B-party was determined to be busy, the system moves to 241 (FIG. 7c) at which the V-MSC determines the current cell or location area of the mobile station of the B-subscriber. Next, at 242, the V-MSC translates the B-subscriber's current cell or location area into its LATAID. At 242 the LATAID of the A-party and the LATAID of the B-party are compared to one another. If the originating LATAID and the terminating LATAID, of the A and B-parties respectively are the same, the system moves to 244 and the V-MSC returns the busy information to the G-MSC via the HLR and by means of the private signaling data circuits. Thereafter, at 245, the G-MSC acts on the busy information it received from the HLR by forwarding the call to a C-number or providing a busy tone to the A-subscriber.

If, however, at 243 the LATAID of the A-party and the LATAID of the B-party are not the same, the V-MSC at 246 returns a roamer routing number to the G-MSC via the HLR, just as if the mobile station of the B-party was not busy. In response, the G-MSC moves at 247 to seize a voice circuit and routes the call to the V-MSC. At 248 the V-MSC either forwards the call to a C-number or provides a busy tone to the A-party. In this case, long distance service providers receive revenue from the use of a voice circuit since the A and B-parties are located in different LATAs.

As can been seen from the procedure set forth in the flow charts of FIGS. 6a–6e and 7a–7c, the system utilizes the LATAID information of both the originating subscriber and the terminating subscriber to ensure that the most efficient call completion techniques are used consistently with regulations governing the completion of automatic roaming calls within the mobile cellular network.

As can be seen from the above illustrations, the inclusion of the LATAID of both the originating and terminating exchanges enables the system to maximize the efficiency of call routing and call setup while still complying with the regulations governing automatic call setup within the mobile cellular network.

While it is believed that the operation and construction of the system of the present invention will be apparent from the foregoing descriptions, the method of operation and structure of the system shown and described has been characterized as being preferred and obvious changes and modifications may be made therein without departing from the spirit and scope of the invention as defined in the following claims.

What is claimed is:

1. A method for the automatic routing of calls within a cellular telecommunication network divided into a plurality of local access and transport areas (LATAs), the network including a plurality of exchanges within which mobile subscribers are located, the exchanges connected to one another by both signaling data lines and voice circuits wherein calls incoming to a gateway exchange are routed to terminating subscribers within other exchanges, and the network including a pre-routing call setup functional capability of locating a terminating subscriber on a voice channel by means of signals sent entirely over said signaling data lines and prior to seizing a voice circuit and routing the call from the gateway exchange to the exchange where the terminating subscriber is currently located, said method comprising:

determining the LATA within which a call to be routed to a terminating subscriber originates;

determining the LATA within which the terminating subscriber is located;

comparing the originating LATA and the terminating LATA at the exchange where the terminating subscriber is currently located;

routing the call from the originating subscriber to the terminating subscriber through the network by enabling said prerouting call setup functional capability in response to the originating LATA and terminating LATA being the same, and disabling said prerouting call setup functional capability in response to the originating LATA and terminating LATA being different so that once the called mobile station is identified within the exchange where it is currently located by means of the signaling data lines, a voice circuit from the gateway exchange to that exchange is seized while the call is attempted to be completed to the terminating mobile station.

2. A method for the automatic routing of calls within a cellular telecommunication network as set forth in claim 1 in which each of said LATAs are identified by a different LATAID number and in which the LATAID of the originating A-party is included within a routing request message sent via the signaling data lines from the gateway exchange to the exchange in which the B-party is currently located.

3. A method for the automatic routing of calls within a cellular telecommunication network as set forth in claim 1 in which the voice circuits interconnecting the exchanges of the cellular network are provided by a long distance telecommunication carrier.

4. A method for the automatic routing of calls within a cellular telecommunication network as set forth in claim 1 in which the LATA of the terminating B-party is determined based upon a last-recorded location of the terminating B-party.

5. A method for the automatic routing of calls within a cellular telecommunication network as set forth in claim 4 in which the LATA of the B-party is determined from the location area or the cell within which the B-party is currently believed to be located.

6. A method for the automatic routing of calls within a cellular telecommunication network as set forth in claim 1 in which said network includes a redirection request functional capability of locating a called mobile station within the network and determining whether that mobile station is busy or does not respond to paging within the exchange where it is believed to be located by means of signals sent entirely over said signaling data lines and prior to seizing a voice circuit and wherein said method further comprises:

enabling said redirection request functional capability in response to the originating LATA and terminating LATA being the same; and disabling said redirection request functional capability in response to the originating LATA and terminating LATA being different so that once the called mobile station is identified within an exchange where it is currently believed to be located by means of the signaling data lines, a voice circuit from the gateway exchange to that exchange is seized while the call is attempted to be completed to the terminating mobile station.

7. A method for the automatic routing of calls within a cellular telecommunication network as set forth in claim 6 in which each of said LATAs are identified by a different LATAID number and in which the LATAID of the originating A-party is included within routing messages sent via the signaling data lines between the gateway exchange and the exchange in which the B-party is currently believed to be located.

8. A method for the automatic routing of calls within a cellular telecommunication network as set forth in claim 6 in which the voice circuits interconnecting the exchanges of the cellular network are provided by a long distance telecommunication carrier.

9. A method for the automatic routing of calls within a cellular telecommunication network divided into a plurality of local access and transport areas (LATAs) each of which is identified by a different LATAID number, the network including a plurality of exchanges within which mobile stations are located by virtue of the storage of current location information in a home location register (HLR) associated with each mobile station which exchanges connected to one another by both signaling data lines and voice circuits wherein a call incoming to a gateway exchange is automatically routed to the called mobile station located within a visited exchange, said method comprising:

receiving a call at the gateway exchange from an A-party directed to the mobile station of a B-party located within said cellular network;

determining the LATAID of the A-party;

sending a location and routing request message via said signaling data lines from said gateway exchange to the HLR of the B-party, said message containing the LATAID of the A-party;

forwarding said routing request message from said HLR of the B-party to the visited exchange in which the B-party is believed to be currently located;

determining within the visited exchange whether the B-party is currently busy;

determining the LATAID of the B-party;

comparing at the visited exchange the LATAID of the A-party with the LATAID of the B-party;

paging the mobile station of the B-party in response to a determination during said step of comparing that the B-party is not busy and that the LATAID of the A-party and the B-party are the same;

placing the mobile station of the B-party paged during said step of paging on a voice radio channel in response to the receipt of a page response therefrom;

returning a routing number identifying the current location of the mobile station of the B-party from the visited exchange to the gateway exchange by means of the signaling data lines;

seizing a voice circuit between the gateway exchange and the visited exchange in response to the receipt of a routing number;

routing the call from the A-party to the visited exchange by means of said seized voice circuit; and setting up the call within the visited exchange from the A-party to the B-party waiting on the radio channel of the visited exchange.

10. A method for the automatic routing of calls within a cellular telecommunication network as set forth in claim 9 which includes the additional steps of:

sending, in response to failure to receive a page response from the paged B-party, a message from the visited exchange to the HLR of the B-party by means of the signaling data lines indicating that the mobile station of the B-party could not be located; and sending a message from the HLR to the gateway exchange by means of the signaling data lines containing information as to how to the handle the uncompleted call from the A-party.

11. A method for the automatic routing of calls within a cellular telecommunication network as set forth in claim 9 which includes the additional steps of:

returning a routing number identifying the current location of the mobile station of the B-party from the visited exchange to the gateway exchange by means of the signaling data lines in response to a determination that the B-party is not busy and that the LATAID of the A-party and the B-party are not the same;

seizing a voice circuit between the gateway exchange and the visited exchange in response to the receipt of a routing number;

routing the call from the A-party to the visited exchange by means of said seized voice circuit;

paging the mobile station of the B-party;

placing the mobile station of the B-party on a voice radio channel and setting up the call within the visited exchange from the A-party to the B-party waiting on the radio channel in response to the receipt of a page response;

providing an announcement to the A-party via the seized voice circuit or forwarding the call to a C-number in response to the failure to receive a page response from the mobile station of the B-party.

12. A method for the automatic routing of calls within a cellular telecommunication network as set forth in claim 9 which includes the additional steps of:

sending, in response to a determination that the B-party is busy and that the LATAID of the A-party and the B-party are the same, a message from the visited exchange to the HLR of the B-party by means of the signaling data lines indicating that the mobile station of the B-party is busy; and sending a message from the HLR to the gateway exchange by means of the signaling data lines containing information as to how to handle the uncompleted call from the A-party.

13. A method for the automatic routing of calls within a cellular telecommunication network as set forth in claim 9 which includes the additional steps of:

returning a routing number identifying the current location of the mobile station of the B-party from the visited exchange to the gateway exchange by means of the signaling data lines in response to a determination that the B-party is busy and that the LATAID of the A-party and the B-party are not the same;

seizing a voice circuit between the gateway exchange and the visited exchange in response to the receipt of a routing number;

routing the call from the A-party to the visited exchange by means of said seized voice circuit;

providing an announcement from the visited exchange to the A-party via the seized voice circuit or forwarding the call to a C-number.

14. A method for the automatic routing of calls within a cellular telecommunication network divided into a plurality of local access and transport areas (LATAs) each of which is identified by a different LATAID number and includes a plurality of exchanges within which mobile stations are located by virtue of the storage of current location information in a home location register (HLR) associated with each mobile and which exchanges are connected to one another by both signaling data lines and voice circuits and wherein a call incoming to a gateway exchange is automatically routed to the called mobile station located within a visited exchange and said called mobile station subscribes to call forwarding to a C-number upon busy or no reply, said method comprising:

receiving a call at the gateway exchange from an A-party directed to the mobile station of a B-party located within said cellular network;

determining the LATAID of the A-party;

sending a location and routing request message via said signaling data lines from said gateway exchange to the HLR of the B-party, said message containing the LATAID of the A-party;

forwarding said routing request message from said HLR of the B-party to the visited exchange in which the B-party is believed to be currently located;

determining within the visited exchange whether the B-party is currently busy;

determining the LATAID of the B-party;

sending, in response to a determination that the B-party is busy, a redirection request message from the visited exchange to the gateway exchange, said message including the LATAID of the B-party;

comparing within the gateway exchange the LATAID of the A-party with the LATAID of the B-party;

obtaining within the gateway exchange a C number from the HLR of the B-party in response to a determination during said step of comparing that the LATAID of the A-party and the B-party are the same;

sending from the gateway exchange to the visited exchange a redirection request acknowledgment message; and setting up a call from the gateway exchange to the C-party.

15. A method for the automatic routing of calls within a cellular telecommunication network as set forth in claim 1 which includes the additional steps of:

tearing down any voice circuits between the gateway exchange and the visited exchange which may have been previously seized prior to setting up the call from the gateway exchange to the C-party.

16. A method for the automatic routing of calls within a cellular telecommunication network divided into a plurality of local access and transport areas (LATAs) each of which is identified by a different LATAID number and includes a plurality of exchanges within which mobile stations are located by virtue of the storage of current location information in a home location register (HLR) associated with each mobile and which exchanges are connected to one another by both signaling data lines and voice circuits and wherein a call incoming to a gateway exchange is automatically routed to the called mobile station located within a visited exchange and said called mobile station subscribes to call forwarding to a C-number upon busy or no reply, said method comprising:

receiving a call at the gateway exchange from an A-party directed to the mobile station of a B-party located within said cellular network;

determining the LATAID of the A-party;

sending a location and routing request message via said signaling data lines from said gateway exchange to the HLR of the B-party, said message containing the LATAID of the A-party;

forwarding said routing request message from said HLR of the B-party to the visited exchange in which the B-party is believed to be currently located;

determining within the visited exchange whether the B-party is currently busy;

determining the LATAID of the B-party;

sending, in response to a determination that the B-party is busy, a redirection request message from the visited exchange to the gateway exchange, said message including the LATAID of the B-party;

comparing within the gateway exchange the LATAID of the A-party with the LATAID of the B-party;

rejecting within the gateway exchange the redirection request message from the visited exchange in response to a determination that the LATAID of the A-party and the B-party are not the same;

seizing a voice circuit and routing said call from the gateway exchange to the visited exchange;

obtaining within the visited exchange a C number from the HLR of the B-party; setting up a call from the visited exchange to the C-party.

17. A system for automatically routing calls within a cellular telecommunication network divided into a plurality of local access and transport areas (LATAs), the network including a plurality of exchanges within which mobile stations are located, the exchanges connected to one another by both signaling data lines and voice circuits wherein calls incoming to a gateway exchange are routed to called mobile stations within other exchanges, and the network including means for performing pre-routing call setup by locating a called mobile station within the network and placing that mobile station on a voice. channel by means of signals sent entirely over said signaling data lines and prior to seizing a voice circuit and routing the call from the gateway exchange to the exchange where the mobile is currently located, said system comprising:

means for determining the LATA within which a call to be routed to a called mobile station originates;

means for determining the LATA within which the the called mobile station is located;

means for comparing the originating LATA and the terminating LATA at the visited exchange; and means for routing the call from the originating subscriber to the terminating subscriber through the network by enabling said pre-routing call setup functional capability in response to the originating LATA and terminating LATA being the same; and disabling said pre-routing call setup functional capability in response to the originating LATA and terminating LATA being different so that once the called mobile station is identified within the exchange where it is currently located by means of the signaling data lines, a voice circuit from the gateway exchange to that exchagne is seized while the call is attempted to be completed to the terminating mobile station.

18. A system for automatically routing calls within a cellular telecommunication network as set forth in claim 17 in which each of said LATAs are identified by a different LATAID number and in which the LATAID of the originating A-party is included within a routing request message sent via the signaling data lines from the gateway exchange to the exchange in which the B-party is currently located.

19. A system for the automatically routing calls within a cellular telecommunication network as set forth in claim 17 in which the voice circuits interconnecting the exchanges of the cellular network are provided by a long distance telecommunication carrier.

20. A system for automatically routing calls within a cellular telecommunication network as set forth in claim 17 in which the LATA of the terminating B-subscriber is determined based upon a last recorded location of the terminating B-subscriber.

21. A system for automatically routing calls within a cellular telecommunication network as set forth in claim 20 in which the LATA of the B-party is determined from the location area or the cell within which the B-party is currently believed to be located.

22. A system for the automatically routing calls within a cellular telecommunication network as set forth in claim 17 in which said network includes means for performing a redirection request by locating a called mobile station within the network and determining whether that mobile station is busy or does not respond to paging within the exchange where it is believed to be located by means of signals sent entirely over said signaling data lines and prior to seizing a voice circuit and routing the call from the gateway exchange to the exchange where the mobile is currently located, said system further comprising:

means for enabling said redirection request functional capability means in response to the originating LATA and terminating LATA being the same; and means for disabling said redirection request functional capability means in response to the originating LATA and terminating LATA being different so that once the called mobile station is identified within an exchange where it is currently believed to be located by means of the signaling data lines, a voice circuit from the gateway exchange to that exchange is seized while the call is attempted to be completed to the terminating mobile station.

23. A system for the automatically routing calls within a cellular telecommunication network as set forth in claim 22 in which each of said LATAs are identified by a different LATAID number and in which the LATAID of the originating A-party is included within routing messages sent via the signaling data lines between the gateway exchange and the exchange in which the B-party is currently believed to be located.

24. A system for the automatically routing calls within a cellular telecommunication network as set forth in claim 22 in which the voice circuits interconnecting the exchanges of the cellular network are provided by a long distance telecommunication carrier.

25. A system for automatically routing calls within a cellular telecommunication network divided into a plurality of local access and transport areas (LATAs), each of which is identified by a different LATAID number and includes a plurality of exchanges within which mobile stations are located by virtue of the storage of current location information in a home location register (HLR) associated with each mobile and which exchanges are connected to one another by both signaling data lines and voice circuits and wherein a call incoming to a gateway exchange is automatically routed to the called mobile station located within a visited exchange, said system comprising:

means for receiving a call at the gateway exchange from an A-party directed to the mobile station of a B-party located within said cellular network;

means for determining the LATAID of the A-party;

means for sending a location and routing request message via said signaling data lines from said gateway exchange to the HLR of the B-party, said message containing the LATAID of the A-party;

means for forwarding said routing request message from said HLR of the B-party to the visited exchange in which the B-party is believed to be currently located;

means for determining within the visited exchange whether the B-party is currently busy;

means for determining the LATAID of the B-party;

means for comparing the LATAID of the A-party with the LATAID of the B-party at the visited exchange;

means for paging the mobile station of the B-party in response to a determination that the B-party is not busy and that the LATAID of the A-party and the B-party are the same;

means for placing the mobile station of the B-party on a voice radio channel in response to the receipt of a page response therefrom;

means for returning a routing number identifying the current location of the mobile station of the B-party from the visited exchange to the gateway exchange by means of the signaling data lines;

means for seizing a voice circuit between the gateway exchange and the visited exchange in response to the receipt of a routing number;

means for routing the call from the A-party to the visited exchange by means of said seized voice circuit; and means for setting up the call within the visted exchange from the A-party to the B-party waiting on the radio channel of the visited exchange.

26. A system for the automatically routing calls within a cellular telecommunication network as set forth in claim 25 which further includes:

means for sending, in response to failure to receive a page response from the paged B-party, a message from the visited exchange to the HLR of the B-party by means of the signaling data lines indicating that the mobile station of the B-party could not be located; and means for sending a message from the HLR to the gateway exchange by means of the signaling data lines containing information as to how to the handle the uncompleted call from the A-party.

27. A system for the automatically routing calls within a cellular telecommunication network as set forth in claim 25 which further includes:

means for returning a routing number identifying the current location of the mobile station of the B-party from the visited exchange to the gateway exchange by means of the signaling data lines in response to a determination that the B-party is not busy and that the LATAID of the A-party and the B-party are not the same;

means for seizing a voice circuit between the gateway exchange and the visited exchange in response to the receipt of a routing number;

means for routing the call from the A-party to the visited exchange by means of said seized voice circuit;

means for paging the mobile station of the B-party;

means for placing the mobile station of the B-party on a voice radio channel and setting up the call within the visited exchange from the A-party to the B-party waiting on the radio channel in response to the receipt of a page response; and means for providing an announcement to the A-party via the seized voice circuit or forwarding the call to a C-number in response to the failure to receive a page response from the mobile station of the B-party.

28. A system for the automatically routing calls within a cellular telecommunication network as set forth in claim 25 which further includes:

means for sending, in response to a determination that the B-party is busy and that the LATAID of the A-party and the B-party are the same, a message from the visited exchange to the HLR of the B-party by means of the signaling data lines indicating that the mobile station of the B-party is busy; and means for sending a message from the HLR to the gateway exchange by means of the signaling data lines containing information as to how to handle the uncompleted call from the A-party.

29. A system for automatically routing calls within a cellular telecommunication network as set forth in claim 25 which further includes:

means for returning a routing number identifying the current location of the mobile station of the B-party from the visited exchange to the gateway exchange by means of the signaling data lines in response to a determination that the B-party is busy and that the LATAID of the A-party and the B-party are not the same;

means for seizing a voice circuit between the gateway exchange and the visited exchange in response to the receipt of a routing number;

means for routing the call from the A-party to the visited exchange by means of said seized voice circuit; and means for providing an announcement from the visited exchange to the A-party via the seized voice circuit or forwarding the call to a C-number.

30. A system for the automatically routing calls within a cellular telecommunication network divided into a plurality of local access and transport areas (LATAs), each of which is identified by a different LATAID number and includes a plurality of exchanges within which mobile stations are located by virtue of the storage of current location information in a home location register (HLR) associated with each mobile and which exchanges are connected to one another by both signaling data lines and voice circuits and wherein a call incoming to a gateway exchange is automatically routed to the called mobile station located within a visited exchange and said called mobile station subscribes to call forwarding to a C-number upon busy or no reply, said system comprising:

means for receiving a call at the gateway exchange from an A-party directed to the mobile station of a B-party located within said cellular network;

means for determining the LATAID of the A-party;

means for sending a location and routing request message via said signaling data lines from said gateway exchange to the HLR of the B-party, said message containing the LATAID of the A-party;

means for forwarding said routing request message from said HLR of the B-party to the visited exchange in which the B-party is believed to be currently located;

means for determining within the visited exchange whether the B-party is currently busy;

means for determining the LATAID of the B-party;

means for sending, in response to a determination by said means for determining that the B-party is busy, a redirection request message from the visited exchange to the gateway exchange, said message including the LATAID of the B-party;

means for comparing within the gateway exchange the LATAID of the A-party with the LATAID of the B-party;

means for obtaining within the gateway exchange a C-number from the HLR of the B-party in response to a determination that the LATAID of the A-party and the B-party are the game;

means for sending from the gateway exchange to the visited exchange a redirection request acknowledgement message; and means for setting up a call from the gateway exchange to the C-party.

31. A system for the automatic routing of calls within a cellular telecommunication network as set forth in claim 30 which further includes:

means for tearing down any voice circuits between the gateway exchange and the visited exchange which may have been previously seized prior to setting up the call from the gateway exchange to the C-party.

32. A system for automatically routing calls within a cellular telecommunication network divided into a plurality of local access and transport areas (LATAs), each of which is identified by a different LATAID number and includes a plurality of exchanges within which mobile stations are located by virtue of the storage of current location information in a home location register (HLR) associated with each mobile and which exchanges are connected to one another by both signaling data lines and voice circuits and wherein a call incoming to a gateway exchange is automatically routed to the called mobile station located within a visited exchange and said called mobile station subscribes to call forwarding to a C-number upon busy or no reply, said system comprising:

means for receiving a call at the gateway exchange from an A-party directed to the mobile station of a B-party located within said cellular network;

means for determining the LATAID of the A-party;

means for sending a location and routing request message via said signaling data lines from said gateway exchange to the HLR of the B-party, said message containing the LATAID of the A-party;

means for forwarding said routing request message from said HLR of the B-party to the visited exchange in which the B-party is believed to be currently located;

means for determining within the visited exchange whether the B-party is currently busy;

means for determining the LATAID of the B-party;

means for sending, in response to a determination that the B-party is busy, a redirection request message from the visited exchange to the gateway exchange, said message including the LATAID of the B-party;

means for comparing within the gateway exchange the LATAID of the A-party with the LATAID of the B-party;

means for rejecting within the gateway exchange the redirection request message from the visited exchange in response to a determination that the LATAID of the A-party and the B-party are not the same;

means for seizing a voice circuit and routing said call from the gateway exchange to the visited exchange;

means for obtaining within the visited exchange a C-number from the HLR of the B-party;

means for setting up a call from the visited exchange to the C-party.

* * * * *

UNITED STATES PATENT AND TRADEMARK OFFICE
CERTIFICATE OF CORRECTION

PATENT NO. : 5,526,400
DATED : Jun. 11, 1996
INVENTOR(S) : Nguyen

It is certified that error appears in the above-indentified patent and that said Letters Patent is hereby corrected as shown below:

| | |
|---|---|
| Column 5, line 28 | Replace "VMSC" With --V-MSC-- |
| Column 5, line 31 | Replace "GMSC" With --G-MSC-- |
| Column 5, line 53 | Replace "GMSC" With --G-MSC-- |
| Column 6, line 43 | Replace "VMSC" With --V-MSC-- |
| Column 7, line 24 | Replace "ba sed" With --based-- |
| Column 8, line 4 | Replace "VMSC" With --V-MSC-- |
| Column 8, line 18 | Replace "VMSC" With --V-MSC-- |
| Column 9, line 10 | Replace "GMSC" With --G-MSC-- |

UNITED STATES PATENT AND TRADEMARK OFFICE
CERTIFICATE OF CORRECTION

PATENT NO. : 5,526,400
DATED : Jun. 11, 1996
INVENTOR(S) : Nguyen

It is certified that error appears in the above-indentified patent and that said Letters Patent is hereby corrected as shown below:

Column 9, line 52   Replace "VMSC"
With --V-MSC--

Column 14, line 59   Replace "claim 1"
With --claim 14--

Signed and Sealed this

Second Day of December, 1997

Attest:

Attesting Officer

BRUCE LEHMAN

Commissioner of Patents and Trademarks